No. 813,934. PATENTED FEB. 27, 1906
J. ALBERS.
PROTECTIVE COVER FOR PNEUMATIC TIRES.
APPLICATION FILED APR. 7, 1905.
Fig. I.
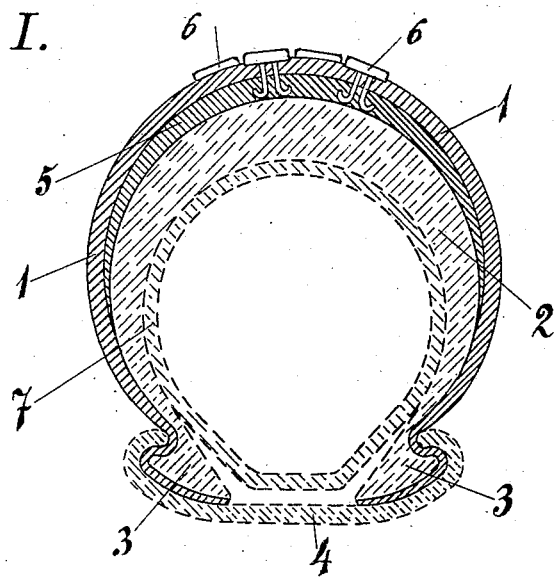
Fig. II.
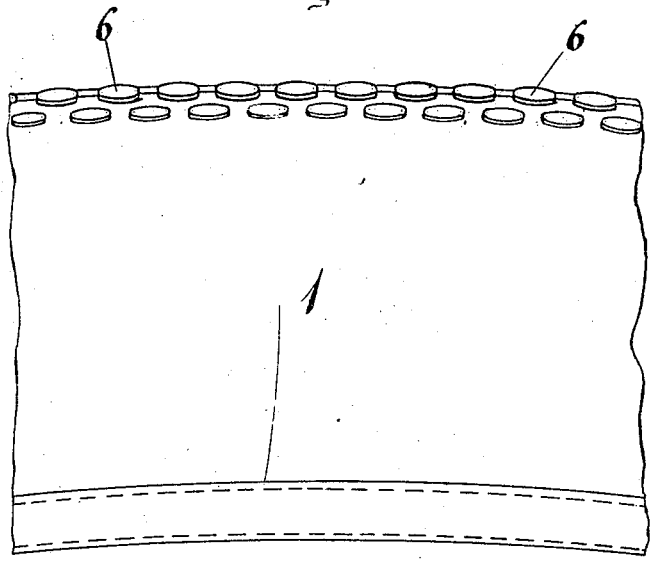
Witnesses:
Geo. Heinicke
A. Stern
Inventor:
Josef Albers
by G. Dittman
Attorney

UNITED STATES PATENT OFFICE.

JOSEF ALBERS, OF AIX-LA-CHAPELLE, GERMANY.

PROTECTIVE COVER FOR PNEUMATIC TIRES.

No. 813,934.

Specification of Letters Patent.

Patented Feb. 27, 1906.

Application filed April 7, 1905. Serial No. 254,415.

*To all whom it may concern:*

Be it known that I, JOSEF ALBERS, a citizen of the German Empire, residing at Aix-la-Chapelle, Prussia, Germany, have invented a new and useful Improvement in Protective Covers for the Pneumatic Tires of Cycles of all Kinds, of which the following is a complete specification, reference being had to the accompanying drawings.

The object of my invention is an improved protective cover for the pneumatic tires of all kinds.

The invention is illustrated in the accompanying drawings, in which—

Figure 1 shows a section through the protective cover and the pneumatic tire to which it is attached. Fig. 2 shows a portion of the cover in side elevation.

The improved protective cover is composed of a strip 1 of leather or other suitable material. The cover is applied to the pneumatic tire 2 over its whole surface and also for special strength around the projection 3 in the wheel-rim 4 and is vulcanized together with the tire. In order to strengthen it, the protective cover has an inner reinforcement 5, which also is formed of leather or of some other suitable material. This reinforcement is cemented at its inner part and affords also thereby a firm attachment to the tire-cover for the double-pronged rivets 6, which are driven in and turned over, as shown in the drawings.

The new protective cover fulfils the requirements which can be made of an efficient protector. It prevents any injury from without, because it is firmly attached to the pneumatic tire and not capable of being shifted. Further, it affords a special protection against the bursting of the pneumatic tire, because it protects the same by completely surrounding it, and thereby prevents the bursting. The closely-arranged construction of the double-pronged rivets 6, Figs. 1 and 2, prevents the penetration of sharp flints and at the same time hinders any slipping on wet ground or at the turning of curves. Thereby all the accidents which occur from these causes may be avoided. Further, the wear of the pneumatic tire by reason of the application of this new protective envelop is rendered impossible.

What I claim is—

Improved protective cover for pneumatic tires of cycles of all kinds, composed of one single, continuous piece of leather adapted to inclose the entire outer surface of the pneumatic tire, including the reinforcements in the wheel-rim and vulcanized with the said tire and secured in the wheel-rim, reinforced internally by a lining of crescent shape in cross-section, secured to the outer cover by double-pointed internally-clenched rivets, presenting outwardly heavy heads on the thread-surface, substantially as described.

In testimony whereof I affix my signature.

JOSEF ALBERS.

In presence of—
 HENRY QUADFLIEG,
 GERARD OELLERS.